United States Patent
Ko

(10) Patent No.: US 8,684,163 B2
(45) Date of Patent: Apr. 1, 2014

(54) DESTROYING APPARATUS FOR ELECTRONIC ELEMENTS

(76) Inventor: Joseph Y. Ko, Irvine, CA (US)

(*) Notice: Subject to any disclaimer, the term of this patent is extended or adjusted under 35 U.S.C. 154(b) by 147 days.

(21) Appl. No.: 13/486,332

(22) Filed: Jun. 1, 2012

(65) Prior Publication Data

US 2013/0319821 A1 Dec. 5, 2013

(51) Int. Cl.
*B65G 29/00* (2006.01)
*B02B 7/02* (2006.01)

(52) U.S. Cl.
USPC ........ 198/392; 198/396; 198/550.01; 241/63; 241/100

(58) Field of Classification Search
USPC ........ 198/392, 396, 550.01, 611; 241/63, 100
See application file for complete search history.

(56) References Cited

U.S. PATENT DOCUMENTS

| | | | |
|---|---|---|---|
| 2,755,026 A * | 7/1956 | Woock | 241/25 |
| 4,664,317 A * | 5/1987 | Morton | 241/36 |
| 4,815,670 A * | 3/1989 | Iwai | 241/34 |
| 4,877,934 A * | 10/1989 | Spinello | 219/68 |
| 4,979,607 A * | 12/1990 | Fogg | 198/392 |
| 5,137,220 A * | 8/1992 | Rose et al. | 241/275 |
| 5,186,305 A * | 2/1993 | Everett | 198/392 |
| 5,718,391 A * | 2/1998 | Musil | 241/207 |
| 5,954,185 A * | 9/1999 | Eshelman et al. | 198/396 |
| 6,112,937 A * | 9/2000 | Takahashi et al. | 221/167 |
| 6,311,825 B1 * | 11/2001 | Schmitt | 198/392 |
| 6,490,232 B2 * | 12/2002 | Sato | 369/30.34 |
| 6,550,701 B1 * | 4/2003 | Chang | 241/36 |
| 6,578,699 B2 * | 6/2003 | Baird et al. | 198/392 |
| 7,270,229 B2 * | 9/2007 | Perazzo et al. | 198/550.4 |
| 7,360,727 B2 * | 4/2008 | Schantz et al. | 241/30 |
| 7,472,782 B2 * | 1/2009 | Corbin | 198/392 |
| 7,527,140 B2 * | 5/2009 | Kodera | 198/396 |
| 7,604,188 B2 * | 10/2009 | Liu et al. | 241/100 |
| 7,669,707 B2 * | 3/2010 | Kenneway | 198/398 |
| 7,852,590 B1 | 12/2010 | Olliges | |
| 7,896,271 B2 * | 3/2011 | Wakeman | 241/100 |
| 7,963,472 B2 * | 6/2011 | Odman et al. | 241/225 |
| 7,971,704 B2 * | 7/2011 | Chi | 198/756 |
| 8,213,702 B2 * | 7/2012 | Yang | 382/141 |
| 8,272,588 B2 * | 9/2012 | Burke et al. | 241/92 |
| 8,430,228 B2 * | 4/2013 | Herzog | 198/392 |
| 2010/0294865 A1 | 11/2010 | Wozny | |
| 2011/0252934 A1 | 10/2011 | Van Gemert et al. | |

* cited by examiner

*Primary Examiner* — Douglas Hess
(74) *Attorney, Agent, or Firm* — Muncy, Geissler, Olds & Lowe, P.C.

(57) ABSTRACT

A destroying apparatus aims to destroy electronic elements with magnetic substance. The destroying apparatus includes a conveying unit and a destroying unit. The conveying unit includes a collection plane to hold a plurality of electronic elements, at least one picking arm spinning against the collection plane to form a conveying path, a barrier portion connecting to the collection plane to block the electronic elements on the conveying path, and a release passage corresponding to the barrier portion to allow the electronic elements to escape the conveying path. The picking arm includes a magnetic attraction portion to attract the magnetic substance on the conveying path. The destroying unit is located correspondingly to the release passage and includes a plurality of cutting elements and a cutting path between the cutting elements to communicate with the release passage.

12 Claims, 5 Drawing Sheets

DESTROYING APPARATUS FOR ELECTRONIC ELEMENTS

FIELD OF THE INVENTION

The present invention relates to a destroying apparatus and particularly to an automatic apparatus to destroy electronic elements with magnetic substance.

BACKGROUND OF THE INVENTION

Portable storage devices such as flash drives and portable hard disks give modern people great convenience in information transmission and storage. Take a flash drive as an example, it provides many advantages, such as smaller size, lighter weight, hot plugging and the like. It usually has a plastic or metallic casing and a USB connector extended from the casing. The USB connector is magnetic and can be attracted to a magnetic material.

With constant growing capacity of the portable storage devices a single such a device can store a great amount of information. In the event that the stored information needs to be thoroughly destroyed, deleting them via a computer operating system cannot meet special confidential requirement as there are many methods available now to restore deleted files. In view of such concern, a lot of methods have been developed and introduced aiming to thoroughly destroy data on storage devices. They generally can be divided into mechanical destroying or non-mechanical destroying. The non-mechanical destroying approach, such as U.S. Pat. No. 7,852,590, exposes a storage device in a high intensity magnetic field of microwave energy to thoroughly eliminate information stored in the storage device. The mechanical destroying approach, such as U.S. publication No. 2010/0294865, butts a storage device via a press arm onto the surface of a grinding wheel that spins at high speed. The storage device is ground to small granules by the emery disk so that it cannot be assembled again. Another type of mechanical destroying approach is disclosed in U.S. publication No. 2011/0252934 which holds a storage device via a clamp equipment and slices the storage device via a cutting equipment into a number of smaller pieces to thoroughly destroy the storage device.

All the aforesaid conventional techniques aim to destroy portable hard disks with larger size, but are not applicable to destroy the flash drives with smaller size. Moreover, their structures are complex and expensive, and cannot perform destroying operation in a large scale. There are still rooms for improvement.

SUMMARY OF THE INVENTION

The primary object of the present invention is to provide a destroying apparatus that costs lower and can destroy smaller storage devices in a large scale.

To achieve the foregoing object, the present invention provides a destroying apparatus for electronic elements. The electronic element includes a body and a magnetic portion connecting to the body. The destroying apparatus includes a conveying unit and a destroying unit. The conveying unit includes a collection plane to hold a plurality of electronic elements, at least one picking arm spinning against the collection plane to form a conveying path, a barrier portion coupled on the collection plane to block the body of the electronic element on the conveying path, and a release passage corresponding to the barrier portion to allow the electronic elements to escape the conveying path. The picking arm includes a magnetic attraction portion movable along the conveying path to attract the magnetic portion of the electronic element on the collection plane and release the electronic element to the release passage upon being blocked by the barrier portion. The destroying unit is located correspondingly to the release passage and includes a plurality of cutting elements and a cutting path between the cutting elements to communicate with the release passage to receive the electronic elements leaving from the conveying unit.

In one embodiment the collection plane is formed at an inclined angle against a horizontal plane to collect the electronic elements.

In another embodiment the conveying unit includes a spindle running through the collection plane and an electric motor to drive the spindle. The spindle drives the picking arm to spin to form a spinning plane parallel with the collection plane.

In yet another embodiment the conveying unit includes a spindle running through the collection plane and forming a deviation angle against a normal vector of the collection plane, and an electric motor to drive the spindle. The spindle drives the picking arm to spin to form a spinning plane inclined against the collection plane.

In yet another embodiment the conveying unit includes a side wall connecting to the barrier portion and surrounding the collection plane.

In yet another embodiment the electronic element is selected from the group consisting of USB, a flash drive and a wireless receiver.

In yet another embodiment the destroying unit includes an electric motor to drive the cutting elements.

In yet another embodiment the destroying apparatus includes a recycling unit corresponding to and located on the cutting path.

In yet another embodiment the destroying apparatus includes a middle housing located between the conveying unit and recycling unit to hold the destroying unit. The middle housing includes a discharge outlet corresponding to the cutting path.

By means of the structure set forth above, the magnetic attraction portion of the conveying unit can convey sequentially a plurality of electronic elements to the destroying unit, and the destroying unit can then destroy the electronic elements via the cutting elements. As the magnetic attraction portion moves repeatedly along the conveying path, after elapsed for a period of time, all the electronic elements on the collection plane can be carried via magnetic force to the destroying unit to be destroyed. Thus the destroying apparatus of the invention can automatically destroy a great amount of electronic elements and save a great deal of manpower and cost.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
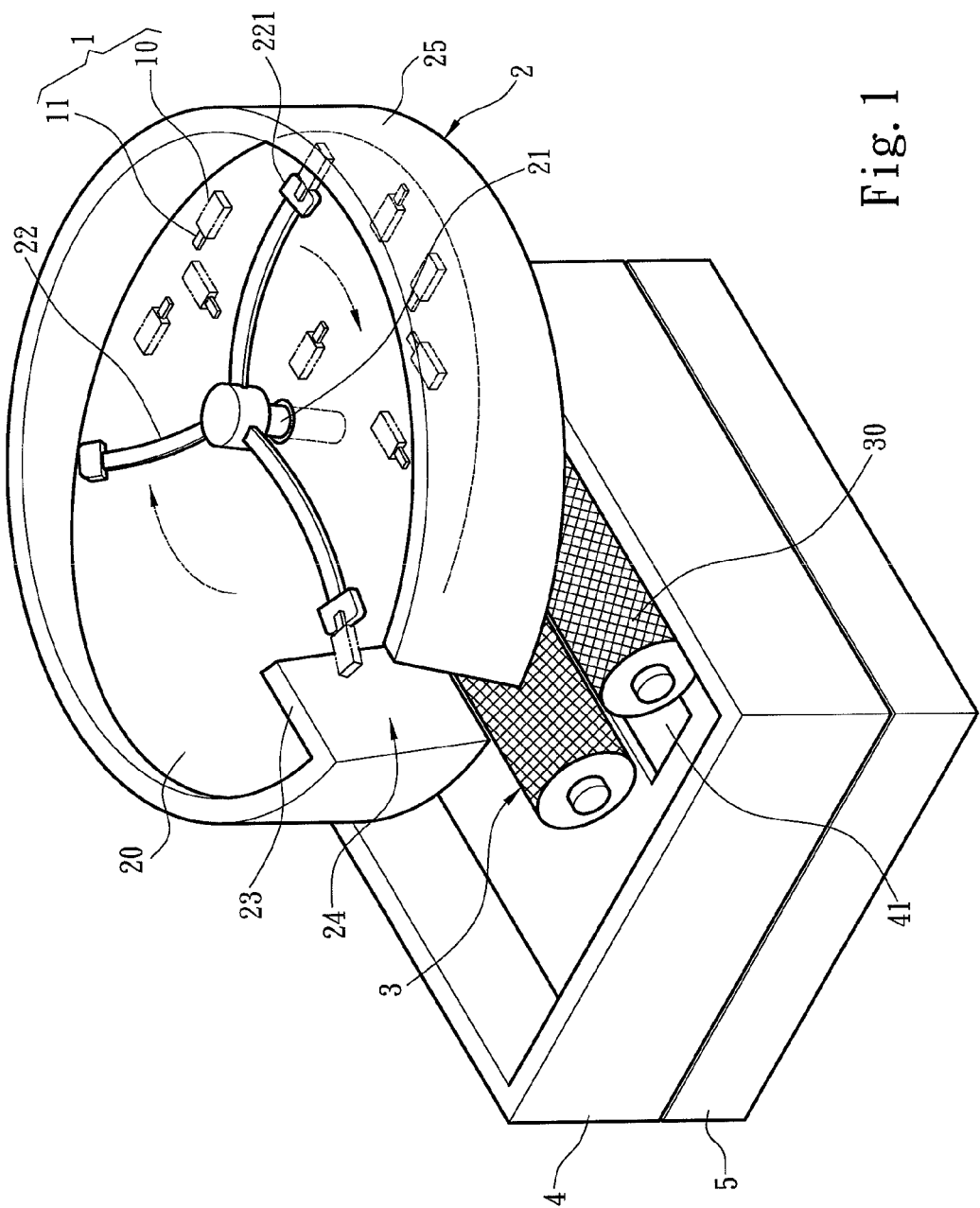
FIG. 1 is a perspective view of an embodiment of the invention.
Figure 2:
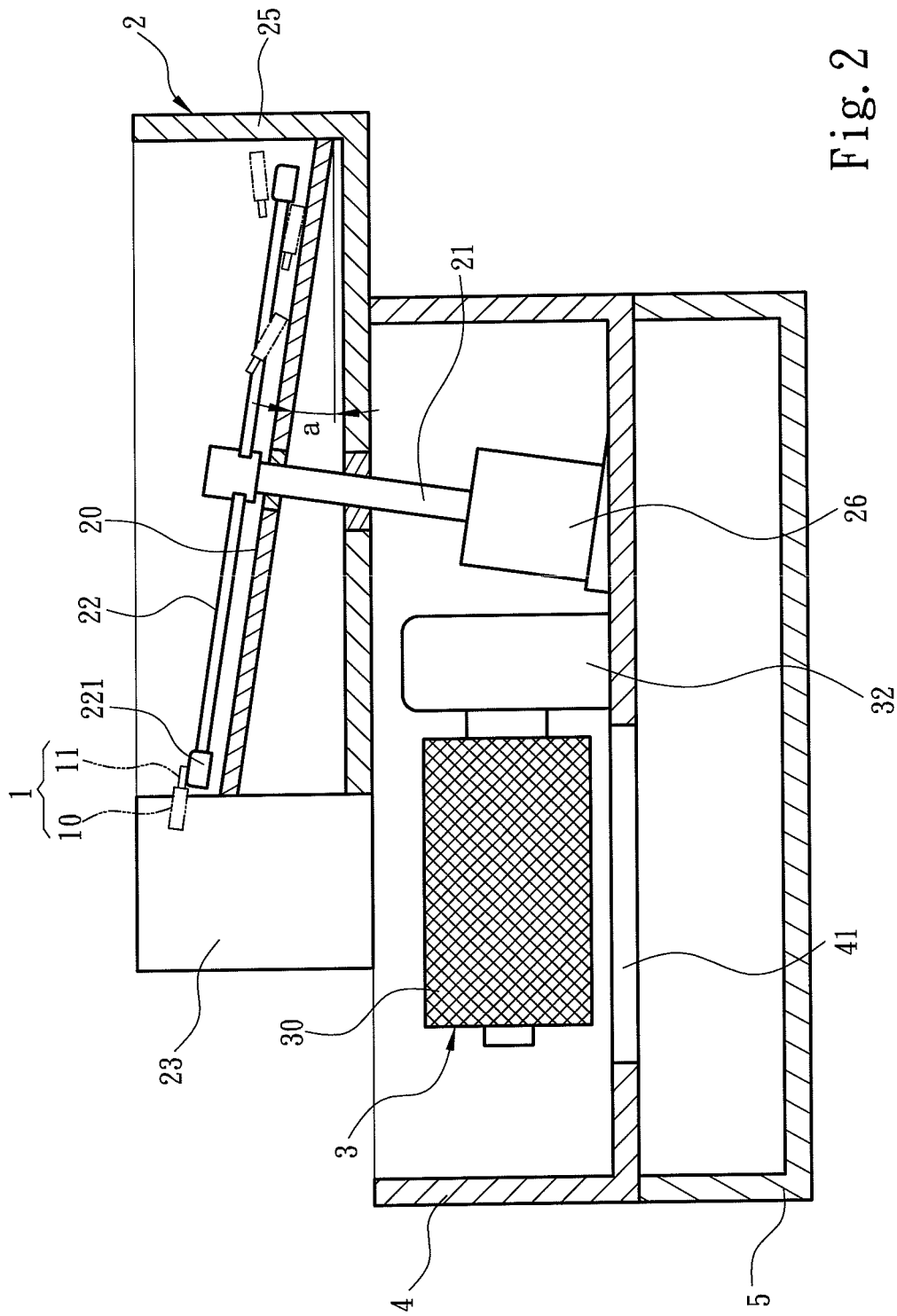
FIG. 2 is a sectional view of an embodiment of the invention seen from a first visual angle.

Please refer to FIGS. 1 and 2 for an embodiment of the invention. The destroying apparatus according to the invention mainly aims to carry an electronic element 1 through magnetism to a cutting path to be destroyed. The electronic element 1 includes a body 10 and a magnetic portion 11 connecting to the body 11. The electronic element 1 can be a USB, a flash drive or a wireless receiver, but this is not the limitation of the invention, any electronic element with magnetic substance is applicable. The destroying apparatus includes a conveying unit 2 to convey the electronic element 1 to be processed and a destroying unit 3 to destroy the electronic element 1.

Figure 4:
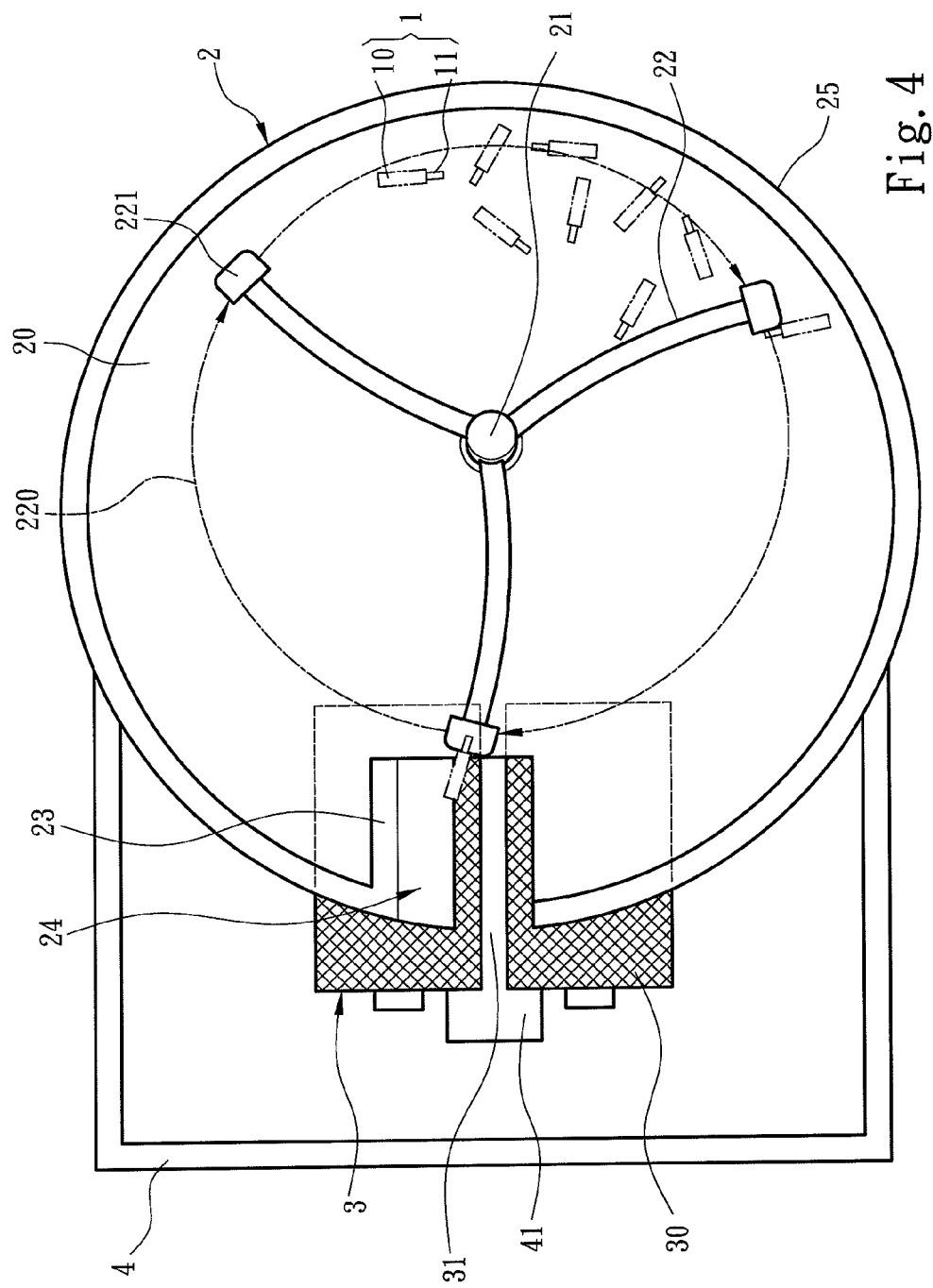
FIG. 4 is a schematic view of an embodiment of the invention in an operating condition.

The conveying unit 2 includes a collection plane 20 to hold a plurality of electronic elements 1, a spindle 21 running through the collection plane 20, an electric motor 26 to drive the spindle 21 and a picking arm 22 connected to the spindle 21 to spin against the collection plane 20 to form a conveying path 220 (referring to FIG. 4). The picking arm 22 includes a magnetic attraction portion 221 to attract a magnetic material. The magnetic portion 11 and magnetic attraction portion 221 can be made of iron, cobalt, nickel, cobalt ferrite (CoFe), nickel ferrite (NiFe), platinum-cobalt alloy (Co—Pt), neodymium magnet (NdFeB) and the oxides thereof, but these are not the limitations of the invention.

Figure 5:
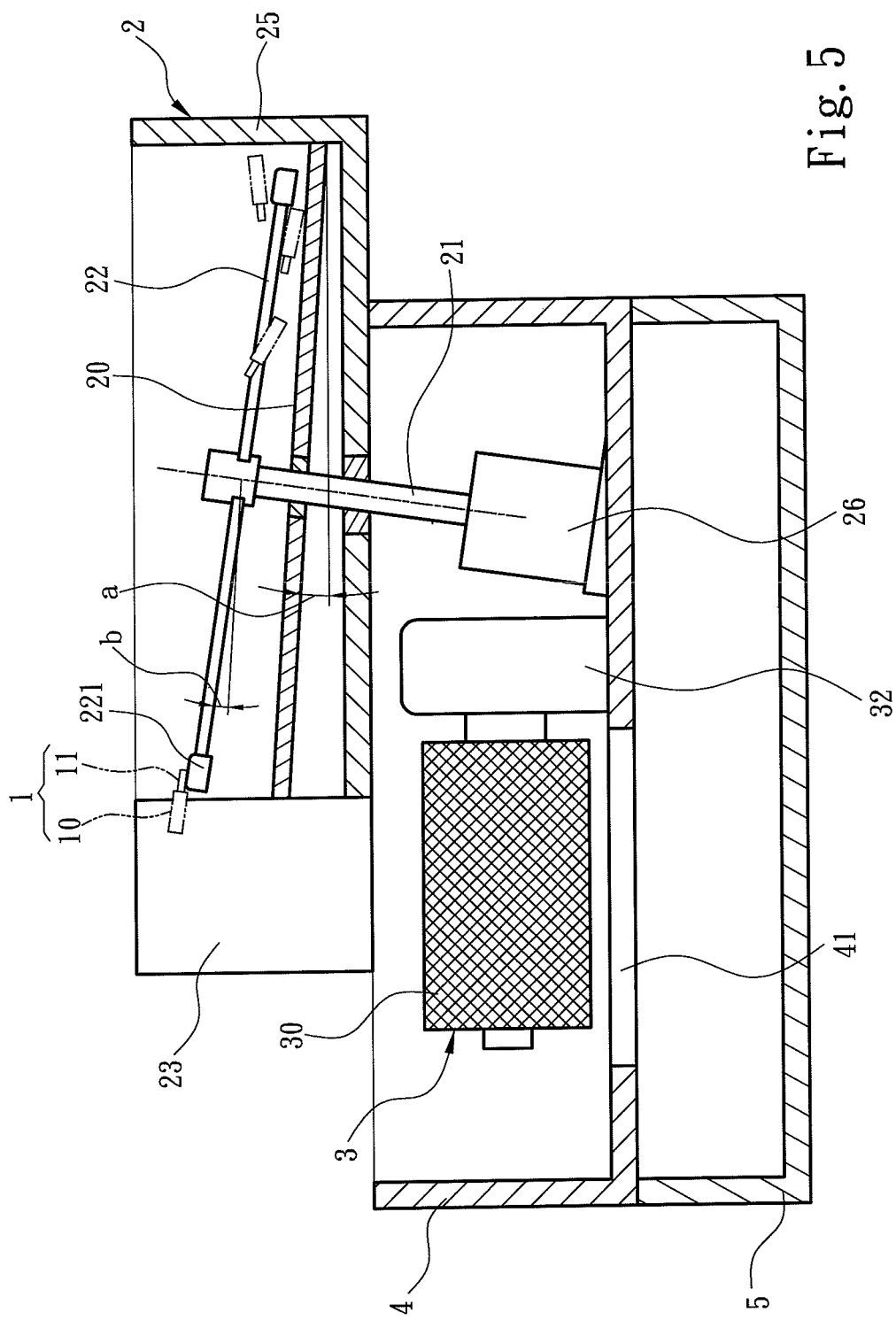
FIG. 5 is a sectional view of another embodiment of the invention

Preferably, the collection plane 20 is formed at an inclined angle a against a horizontal plane. The collection plane 20 can be divided into a lower zone and a lift zone connected to the lower zone. The electronic elements 1 on the collection plane 20 are drawn by gravity and gathered at the lower zone of the collection plane 20. The spindle 21 is parallel with a normal vector of the collection plane 20. The spindle 21 drives the picking arm 22 to spin to form a spinning plane parallel with the collection plane 20. But in another embodiment as shown in FIG. 5, aside from forming the inclined angle a between the collection plane 20 and horizontal plane, the spindle 21 also forms a deviation angle b against the normal vector of the collection plane 20. Hence the spindle 21 drives the picking arm 22 to spin to form a spinning plane inclined against the collection plane 20 by the deviation angle b. It is to be noted that a virtual line extended from the junction of the spindle 21 and picking arm 22 is parallel with the collection plane 20. In the two embodiments previously discussed, the conveying path 220 is located on the periphery of the spinning plane. More specifically, referring to FIGS. 1, 2 and 4, the conveying unit 2 includes a barrier portion 23 connected to the collection plane 20, a release passage 24 corresponding to the barrier portion 23 to allow the electronic element 1 to escape the conveying path 220 and a side wall 25 connecting to the barrier portion 23 and surrounding the collection plane 20. The barrier portion 23 blocks the body 10 on the conveying path 220. In an embodiment of the invention, the barrier portion 23 is located correspondingly to the life zone of the collection plane 20. The electronic element 1 is confined by the side wall 25 without escaping from the collection plane 20.

Figure 3:
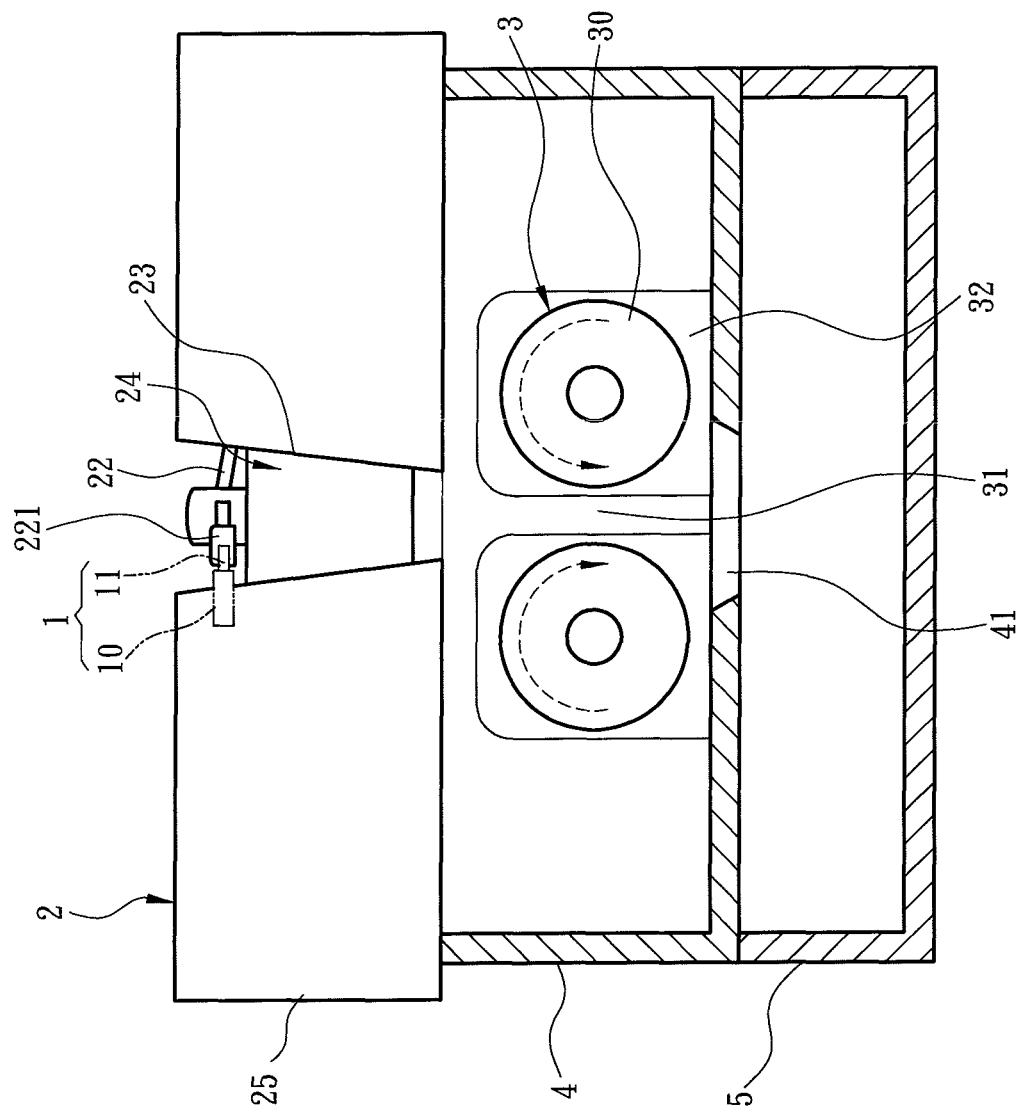
FIG. 3 is a sectional view of an embodiment of the invention seen from a second visual angle.

Referring to FIG. 3, in an embodiment of the invention, the destroying unit 3 is located correspondingly to the release passage 24 and held in a middle housing 4. The destroying unit 3 includes a plurality of cutting elements 30, another electric motor 32 driving the cutting elements 30 and a cutting path 31 between the cutting elements 30 to communicate with the release passage 24 to receive the electronic element 1 leaving from the conveying unit 2. In addition, in order to recycle the electronic element 1 passing through the cutting path 31, the destroying apparatus of the invention also includes a recycling unit 5 corresponding to the cutting path 31. The middle housing 4 is located between the conveying unit 2 and recycling unit 5. The middle housing 4 has a discharge outlet 41 corresponding to the cutting path 31. Hence the electronic element 1 can pass through the release passage 24, cutting path 31 and discharge outlet 41 to be gathered in the recycling unit 5.

Please refer to FIG. 4 for an embodiment of the invention in an operating condition. First, a number of electronic elements 1 are loaded onto the collection plane 20; as the collection plane 20 is tilted at an inclined angle a against the horizontal plane, the electronic elements 1 are gathered at the lower zone of the collection plane 20; next, the picking arm 22 is driven by the electric motor 26 (referring to FIG. 2) to spin against the collection plane 20, and the magnetic attraction portion 221 of the picking arm 22 attracts the magnetic portions 11 of the electronic elements 1 on the collection plane 20; the magnetic attraction portion 221 is driven by the picking arm 22 to move along the conveying path 220 to the barrier portion 23; due to the body 10 of the electronic element 1 is not magnetic and does not attracted by the magnetic attraction portion 221, it is deviated from the conveying path 220, thus when the body 10 is moved to the barrier portion 23, it is blocked by the barrier portion 23 and escapes the magnetic attraction portion 221 as shown in FIG. 3, and then the electronic element 1 drops via the release passage 24 into the cutting path 31; the cutting elements 30 are driven by the another electric motor 32 (referring to FIG. 2) to spin, hence they cut the electronic element 1 moved on the cutting path 31 until the electronic element 1 is thoroughly destroyed; finally, the destroyed electronic element 1 passes through the discharge outlet 41 and drops into the recycling unit 5; when a selected amount of the destroyed electronic elements 1 are gathered in the recycling unit 5, they can be collected together to be treated in recycling processes. It is to be noted that the amount of the electronic element 1 attracted by the magnetic attraction portion 221 could vary according to the magnetic intensity of the magnetic attraction portion 221. The magnetic attraction portion 221 previously discussed can attract one electronic element 1, but this is not the limitation of the invention.

As a conclusion, the destroying apparatus of the invention can destroy electronic elements with magnetic portions. The destroying apparatus includes a conveying unit and a destroying unit. The conveying unit has a collection plane inclined against the horizontal plane, a magnetic attraction portion spinning against the collection plane to attract the electronic element on a conveying path and a barrier portion to release the electronic element from the conveying path to a release passage. The destroying unit is located correspondingly to the release passage to destroy the electronic element dropped to the release passage. Through the aforesaid structure, users can load a great amount of electronic elements to be processed into the conveying unit, and the picking arm of the conveying unit can convey a desired amount of electronic elements to the release passage to be destroyed by the destroying unit.

The destroying apparatus of the invention thus formed can automatically destroy a great amount of electronic elements to save a great deal of manpower and cost. It provides significant improvements over the conventional techniques.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A destroying apparatus for electronic elements, each element including a body and a magnetic portion connecting to the body, the destroying apparatus comprising:
a conveying unit which includes a collection plane to hold a plurality of electronic elements, at least one picking arm spinning against the collection plane and forming a conveying path, a barrier portion connected to the collection plane to block the body of each of the plurality of electronic elements on the conveying path, and a release passage corresponding to the barrier portion to allow the plurality of electronic elements to escape the conveying path; the picking arm including a magnetic attraction portion movable along the conveying path to attract the magnetic portion of each of the plurality of electronic elements on the collection plane and release the electronic element to the release passage upon being blocked by the barrier portion; and
a destroying unit which is located correspondingly to the release passage and includes a plurality of cutting elements and a cutting path between the plurality of cutting elements to communicate with the release passage to receive the plurality of electronic elements leaving from the conveying unit.

2. The destroying apparatus of claim 1, wherein the collection plane is formed at an inclined angle against a horizontal plane to collect the electronic elements.

3. The destroying apparatus of claim 2, wherein the conveying unit includes a spindle running through the collection plane and forming a deviation angle against a normal vector of the collection plane, and an electric motor to drive the spindle, the spindle driving the picking arm to spin to form a spinning plane inclined against the collection plane.

4. The destroying apparatus of claim 2, wherein the conveying unit includes a spindle running through the collection plane and an electric motor to drive the spindle, the spindle driving the picking arm to spin to form a spinning plane parallel with the collection plane.

5. The destroying apparatus of claim 1, wherein the conveying unit includes a spindle running through the collection plane and forming a deviation angle against a normal vector of the collection plane, and an electric motor to drive the spindle, the spindle driving the picking arm to spin to form a spinning plane inclined against the collection plane.

6. The destroying apparatus of claim 1, wherein the conveying unit includes a spindle running through the collection plane and an electric motor to drive the spindle, the spindle driving the picking arm to spin to form a spinning plane parallel with the collection plane.

7. The destroying apparatus of claim 1, wherein the conveying unit includes a side wall connecting to the barrier portion and surrounding the collection plane.

8. The destroying apparatus of claim 1, wherein the magnetic attraction portion is made of a material selected from the group consisting of iron, cobalt, nickel, cobalt ferrite (CoFe), nickel ferrite (NiFe), platinum-cobalt alloy (Co—Pt), neodymium magnet (NdFeB) and oxides thereof.

9. The destroying apparatus of claim 1, wherein the electronic elements are respectively selected from the group consisting of Universal Serial Bus (USB), a flash drive and a wireless receiver.

10. The destroying apparatus of claim 1, wherein the destroying unit includes another electric motor to drive the cutting elements.

11. The destroying apparatus of claim 1 further including a recycling unit corresponding to the cutting path.

12. The destroying apparatus of claim 11 further including a middle housing which is located between the conveying unit and the recycling unit to hold the destroying unit and includes a discharge outlet corresponding to the cutting path.

* * * * *